(12) United States Patent
Homma et al.

(10) Patent No.: US 8,570,283 B2
(45) Date of Patent: Oct. 29, 2013

(54) INFORMATION PROCESSING APPARATUS, INFORMATION PROCESSING METHOD, AND PROGRAM

(75) Inventors: Fuminori Homma, Tokyo (JP); Kouichi Matsuda, Tokyo (JP); Tatsushi Nashida, Kanagawa (JP)

(73) Assignee: Sony Corporation, Tokyo (JP)

( * ) Notice: Subject to any disclaimer, the term of this patent is extended or adjusted under 35 U.S.C. 154(b) by 652 days.

(21) Appl. No.: 12/635,030

(22) Filed: Dec. 10, 2009

(65) Prior Publication Data

US 2010/0177121 A1 Jul. 15, 2010

(30) Foreign Application Priority Data

Dec. 12, 2008 (JP) .............................. P2008-316976

(51) Int. Cl.
*G06F 3/041* (2006.01)
*G06F 3/048* (2013.01)

(52) U.S. Cl.
USPC .......................................... 345/173; 715/773

(58) Field of Classification Search
None
See application file for complete search history.

(56) References Cited

U.S. PATENT DOCUMENTS

| 7,889,185 | B2 * | 2/2011 | Blumenberg et al. | 345/173 |
| 7,956,869 | B1 * | 6/2011 | Gilra | 345/592 |
| 2004/0135823 | A1 * | 7/2004 | Wingett et al. | 345/856 |
| 2007/0262965 | A1 * | 11/2007 | Hirai et al. | 345/173 |
| 2007/0300182 | A1 * | 12/2007 | Bilow | 715/799 |
| 2008/0024451 | A1 * | 1/2008 | Aimi et al. | 345/168 |
| 2009/0251422 | A1 * | 10/2009 | Wu et al. | 345/173 |
| 2009/0303200 | A1 * | 12/2009 | Grad | 345/173 |
| 2010/0073302 | A1 * | 3/2010 | Ritzau et al. | 345/173 |

FOREIGN PATENT DOCUMENTS

| JP | 2000-330946 | 11/2000 |
| JP | 2008-052536 | 3/2008 |

* cited by examiner

*Primary Examiner* — Nicholas Lee
(74) *Attorney, Agent, or Firm* — Sherr & Jiang, PLLC

(57) ABSTRACT

There is provided an information processing apparatus including a detection unit for detecting an angle of an operating body to a reference coordinate axis on a display screen and an execution unit for executing a predetermined processing in accordance with the angle of the operating body detected by the detection unit.

19 Claims, 9 Drawing Sheets

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program. More particularly, the present invention relates to an information processing apparatus, an information processing method, and a program that use a touch panel to perform operation.

2. Description of the Related Art

In the past, a mobile apparatus such as a cellular phone is peculiar in that the keyboard is mainly operated with the thumb while the apparatus main body is gripped by one hand. Therefore, the key arrangement of the keyboard is in accordance with such operational environment. For example, frequently used keys are arranged within a range in which the thumb can move smoothly, and a cancel key is arranged at such a place that the cancel key is difficult to press so as to prevent erroneous operation.

The key arrangement made taking the above peculiarity into consideration is based on the operational environment in which the mobile apparatus is assumed to be used by right-handed people. Therefore, the key arrangement is very difficult for left-handed people to operate. Alternatively, when an apparatus for right-handed people and an apparatus for left-handed people are prepared separately, there arises an issue in that each apparatus can be used only by intended people, and in addition, the cost increases since it is necessary to arrange two different types of apparatuses.

Further, not only the key arrangement but also other input and output devices such as functions of mouse-buttons and a display position on a display screen are sometimes difficult to use depending on how the apparatus main body is gripped. For this issue, for example, Japanese Patent Application Laid-Open (JP-A) No. 2000-330946 discloses a technique in which touch sensors are arranged at a plurality of positions on the outside of the apparatus so as to detect how the apparatus is gripped by a user. In the technique of JP-A No. 2000-330946 how a user grips the apparatus can be detected based on a contact situation of the touch sensors arranged on the outside of the apparatus, thus being able to change the key arrangement and the like accordingly.

SUMMARY OF THE INVENTION

However, the technique of JP-A No. 2000-330946 has an issue in that the apparatus requires the unique mechanism including the plurality of touch sensors arranged on the outside of the hardware only for preparing the apparatus exclusively for right-handed or left-handed people, thus resulting in low versatility. Further, there is an issue in that a user may not switch an input and output function unless the user touches the touch sensors on the outside of the apparatus, and therefore, dynamic processings may not be executed in accordance with the gripping manner.

In light of the foregoing, it is desirable to provide a novel and improved information processing apparatus, information processing method, and program capable of executing a predetermined processing in accordance with the angle of an operating body, with which the information processing apparatus is operated.

According to an embodiment of the present invention, there is provided an information processing apparatus including a detection unit for detecting an angle of an operating body to a reference coordinate axis on a display screen, and an execution unit for executing a predetermined processing in accordance with the angle of the operating body detected by the detection unit.

The predetermined processing executed by the execution unit includes a plurality of processings, and the execution unit may execute one of the plurality of processings in accordance with the angle of the operating body detected by the detection unit.

With such configuration, the angle of the operating body to the reference coordinate axis on the display screen is detected, and the predetermined processing is executed in accordance with the detected angle of the operating body. The predetermined processing includes a plurality of processings, and one of the plurality of processings can be executed in accordance with the angle of the operating body. Therefore, the predetermined processing can be executed in accordance with the angle of the operating body being in contact with or in proximity to the display screen of the information processing apparatus.

The detection unit may use a touch panel using a capacitance or an infrared light to detect the angle of the operating body brought in contact with or in proximity to the information processing apparatus.

The plurality of processings executed by the execution unit are processings of a same level, and the execution unit may execute one of the processings of the same level in accordance with the angle of the operating body detected by the detection unit.

The plurality of processings executed by the execution unit are an upper level processing and a lower level processing, and the execution unit may execute any one of the upper level processing and the lower level processing in accordance with the angle of the operating body detected by the detection unit.

The detection unit may detect the angle of the operating body in accordance with a positional relationship between a first barycenter position of a contacting portion of the operating body and a second barycenter position of a proximity portion of the operating body.

The detection unit may calculate a vector from the first barycenter position to the second barycenter position, and detects the angle of the operating body to the reference coordinate axis on the display screen based on a direction of the vector.

The detection unit may determine that the operating body is a finger of right hand when the direction of the vector from the first barycenter position to the second barycenter position is determined to be inclined to right to the reference coordinate axis on the display screen, and may determine that the operating body is a finger of left hand when the direction of the vector is determined to be inclined to left to the reference coordinate axis on the display screen.

The information processing apparatus may include a display control unit for overlaying and displaying a plurality of display layers on the display screen. The execution unit may select one of the plurality of display layers displayed on the display screen in accordance with the angle of the operating body detected by the detection unit, and the display control unit may display, on a foreground of the display screen, the display layer selected by the execution unit.

The display control unit may overlay and display the plurality of display layers on the display screen in such a manner that the plurality of display layers are transparent, and the execution unit may select one of the plurality of display layers displayed on the display screen in accordance with the angle of the operating body detected by the detection unit, and the display control unit may display the display layer selected by the execution unit upon increasing an opacity of the display layer selected by the execution unit.

According to another embodiment of the present invention, there is provided an information processing method including detecting an angle of an operating body to a reference coordinate axis on a display screen, and executing a predetermined processing in accordance with the detected angle of the operating body.

According to another embodiment of the present invention, there is provided a program for causing a computer to function as an information processing apparatus including a detection unit for detecting an angle of an operating body to a reference coordinate axis on a display screen, and an execution unit for executing a predetermined processing in accordance with the angle of the operating body detected by the detection unit.

As described above, according to an embodiment of the present invention, the predetermined processing can be executed in accordance with the angle of the operating body, with which the information processing apparatus is operated.

DETAILED DESCRIPTION OF THE EMBODIMENTS

Figure 1:
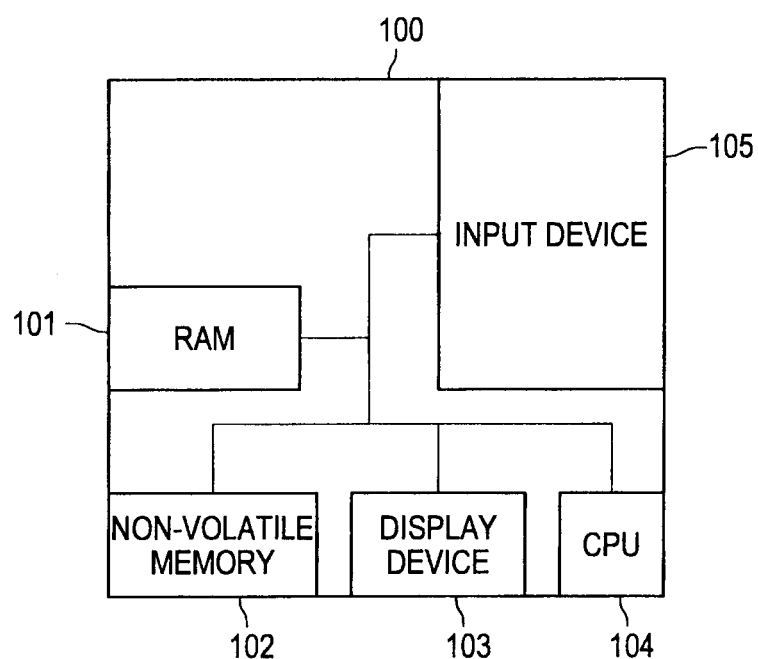
FIG. 1 is a block diagram showing a hardware configuration of an information processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Further, the best mode for carrying out the invention will be described in the order listed below.

(1) Purpose of the present embodiment
(2) Hardware configuration of the information processing apparatus
(3) Functional configuration of the information processing apparatus
(4) Display examples of the information processing apparatus
(5) Operation of the information processing apparatus (1) Purpose of the Present Embodiment First, the purpose of an embodiment of the present invention will be explained. In the past, a mobile apparatus such as a cellular phone is peculiar in that the keyboard is mainly operated with the thumb while the apparatus main body is gripped by one hand. Therefore, the key arrangement of the keyboard is arranged in accordance with such operational environment. For example, frequently used keys are arranged within a range in which the thumb can move smoothly, and a cancel key is arranged at such a place that the cancel key is difficult to press so as to prevent erroneous operation.

The key arrangement made taking the above peculiarity into consideration is based on the operational environment in which the mobile apparatus is assumed to be used by right-handed people. Therefore, the key arrangement is very difficult for left-handed people to operate. Alternatively, when an apparatus for right-handed people and an apparatus for left-handed people are prepared separately, there arises an issue in that each apparatus can be used only by intended people, and in addition, the cost increases since it is necessary to arrange two different types of apparatuses.

Figure 9A:
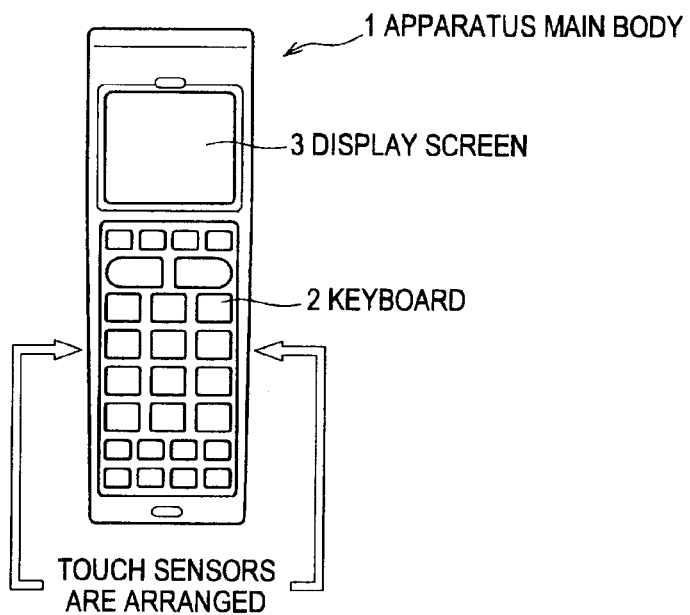
FIG. 9 is an explanatory diagram illustrating operation of a cellular phone in the past.

Further, not only the key arrangement but also other input and output devices such as functions of mouse-buttons and a display position on a display screen are sometimes difficult to use depending on how the apparatus main body is gripped. For this issue, there is disclosed a technique for an apparatus, as shown in FIG. 9A, having touch sensors arranged at a plurality of positions on the outside of the apparatus so as to detect how the apparatus is gripped by a user.

Figures 9B, 9C:
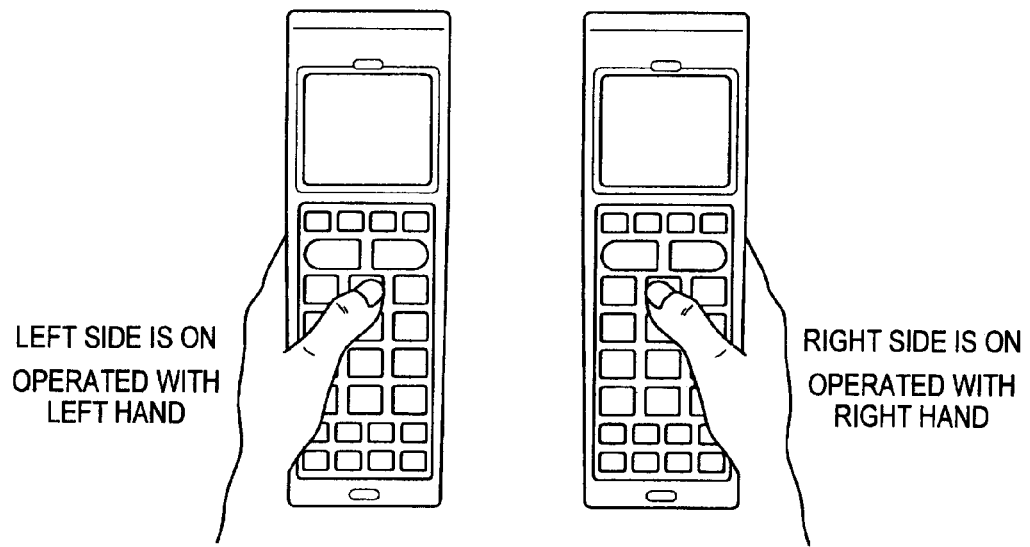

According to the above technique, the apparatus can detect how a user grips the apparatus based on a contact situation of the touch sensors arranged on the outside of the apparatus, thus being able to change the key arrangement and the like accordingly. For example, when the apparatus is gripped by the left hand as shown in FIG. 9B, a touch sensor on the left side is turned on, so that a key arrangement for the left hand is shown on the display screen. On the other hand, when the apparatus is gripped by the right hand as shown in FIG. 9C, a touch sensor on the right side is turned on, so that a key arrangement for the right hand is shown on the display screen.

However, the method shown in FIG. 9 has an issue in that the apparatus requires the unique mechanism including the plurality of touch sensors arranged on the outside of the hardware only for preparing the apparatus exclusively for right-handed or left-handed people, thus resulting in low versatility. Further, there is an issue in that a user may not switch an input and output function unless the user touches the touch sensors on the outside of the apparatus, and therefore, dynamic processings may not be executed in accordance with the gripping manner.

Therefore, an information processing apparatus 100 according to the embodiment of the present invention has been created in view of the above circumstances. The information processing apparatus 100 according to the present embodiment can execute a predetermined processing in accordance with the angle of the operating body, with which the information processing apparatus is operated.

In the present embodiment, a cellular phone, a personal digital assistant (PDA), a portable audio player, and a portable media player are explained as examples of the information processing apparatus 100, but the information processing apparatus 100 is not limited to these examples. A personal computer may be employed as the information processing apparatus 100. In the present embodiment, the information processing apparatus 100 is made integrally with a display device such as a display, but the information processing apparatus 100 is not limited to such an example. The information processing apparatus 100 and the display device may be made as separate apparatuses.

The user can touch the display screen of the information processing apparatus 100 with a finger such as the thumb while the user grips the information processing apparatus 100 with one hand. At this occasion, the direction of the finger touching the display screen changes depending on whether the user grips the information processing apparatus 100 with the right hand or with the left hand. The information processing apparatus 100 uses a touch panel and the like to detect the direction of the finger of the user, and can execute various processings in accordance with the direction of the finger.

(2) Hardware Configuration of the Information Processing Apparatus

Next, the hardware configuration of the information processing apparatus 100 according to the present embodiment will be explained based on FIG. 1. FIG. 1 is a block diagram showing the hardware configuration of the information processing apparatus 100 according to the present embodiment.

The information processing apparatus 100 includes a random access memory (RAM) 101, a non-volatile memory 102, a display device 103, a central processing unit (CPU) 104, and an input device 105.

The CPU 104 functions as an arithmetic processing apparatus and a control apparatus to control overall operation in the information processing apparatus 100 in accordance with various programs. Alternatively, the CPU 104 may be a microprocessor. The non-volatile memory 102 stores programs, arithmetic parameters, and the like to be used by the CPU 104. The RAM 101 primarily stores programs used during execution of the CPU 104 and parameters changing as necessary during the execution. These are connected with each other by a host bus (not shown) made with a CPU bus and the like.

The display device 103 is an example of an output device of the information processing apparatus 100. The display device 103 is made with, for example, a liquid crystal display (hereinafter referred to as LCD) device, and outputs results obtained from various processings performed by the information processing apparatus 100. Specifically, the display device 103 displays the results obtained from various processings performed by the information processing apparatus 100, as texts and images.

The input device 105 includes input means, an input control circuit, and the like. The input means is, for example, a mouse, a keyboard, a touch screen, a button, a microphone, a switch, and a lever, with which a user inputs information. The input control circuit generates an input signal based on an input from a user, and outputs the input signal to the CPU 104. A user of the information processing apparatus 100 can input various data to the information processing apparatus 100 and can instruct the information processing apparatus 100 to perform processing operations by operating the input device 105.

In the present embodiment, user's operation is received by mainly using a touch panel to detect an operating body such as a finger of a user. The touch panel has two functions; display and input. The touch panel according to the present embodiment can detect the angle of a finger and the like of a user brought in proximity to or in contact with the touch panel. The detecting method may be a method capable of detecting positional information of the operating body on the display, such as a resistive film method using a metallic thin film forming a transparent electrode, a capacitive method detecting a position by obtaining a change of capacitance between a finger and a conductive film, an infrared interruption method, and an electromagnetic induction method.

Figure 2:
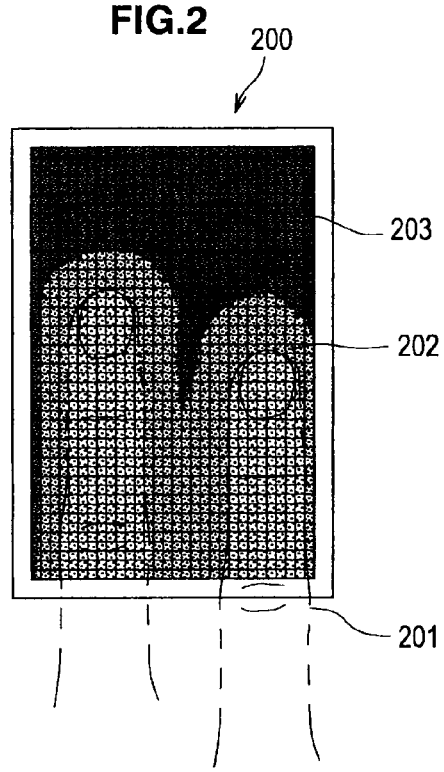
FIG. 2 is an explanatory diagram illustrating a detection method of an operating body with an electrostatic touch panel according to the embodiment.
Figure 2:
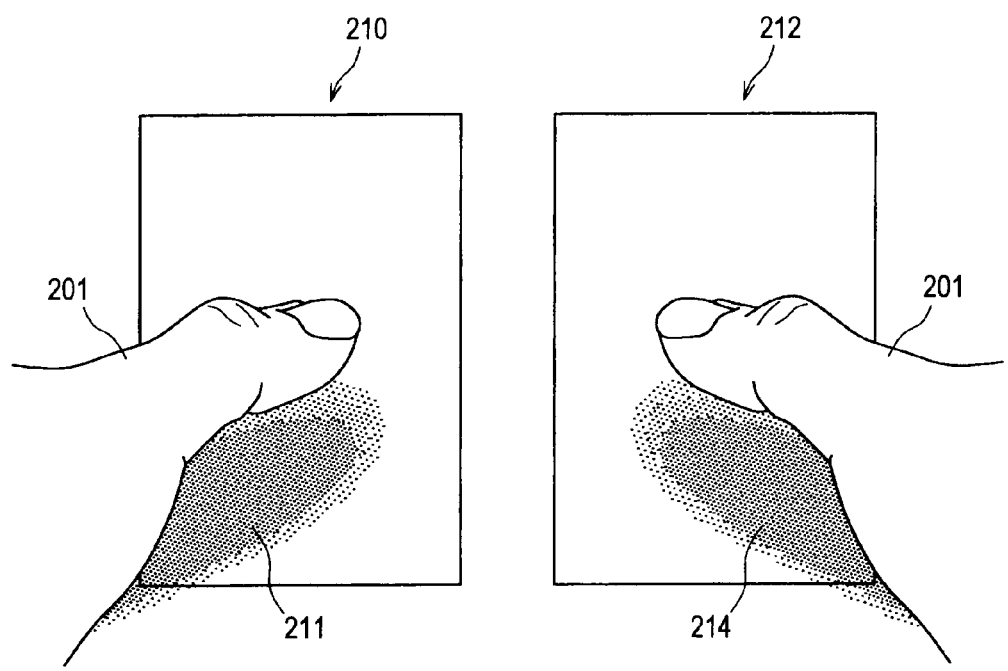

In particular, the method using an electrostatic touch panel to detect the angle of the operating body will be explained in the present embodiment. Hereinafter, the detection method of the operating body with the electrostatic touch panel will be explained with reference to FIG. 2. FIG. 2 is an explanatory diagram illustrating the detection method of the operating body with the electrostatic touch panel. As shown in the explanatory diagram 200 of FIG. 2, the electrostatic touch panel has electrostatic sensors arranged in a matrix (for example, 10 by 7), and the values of the electrostatic sensors are changed in accordance with the change of the capacitance.

When a user's finger, i.e., the operating body, is brought in proximity to or in contact with the electrostatic sensor of the electrostatic touch panel, the capacitance of the electrostatic sensor increases. Generally, an interaction such as tapping is performed based on the change of the increased amount. Further, the capacitance of each of the electrostatic sensors can be obtained at a time. In this case, the shape of the finger coming in proximity to or in contact with the electrostatic touch panel can be detected by detecting, at a time, the changes of the capacitances of all of the electrostatic sensors of the electrostatic touch panel and interpolating the detected changes.

How the shape of the finger brought in proximity to or in contact with the electrostatic touch panel is detected will be explained with reference to the explanatory diagram 200 of FIG. 2. In the explanatory diagram 200, an area 202 denotes an area in which the capacitance of the electrostatic sensor increases, and an area 203 denotes an area in which the capacitance of the electrostatic sensor does not change. When the operating body (finger) 201 is brought in proximity to or in contact with the electrostatic touch panel, the capacitance of the electrostatic sensor changes. Therefore, as shown in the explanatory diagram 200, the shape of the area 202 changes in accordance with the shape of the operating body 201, so that the shape of the operating body 201 can be detected.

As described above, the shape and the direction of the operating body 201 can be detected based on the change of capacitance by using the electrostatic touch panel. For example, when a user brings the thumb of left hand in proximity to or in contact with the electrostatic touch panel, the capacitance changes in the area 211 as shown in the explanatory diagram 210, so that the shape and the direction of the thumb of left hand can be detected. On the other hand, when a user brings the thumb of right hand in proximity to or in contact with the electrostatic touch panel, the capacitance changes in the area 214 as shown in the explanatory diagram 212, so that the shape and the direction of the thumb of right hand can be detected. The method for using the electrostatic touch panel to detect the angle of the operating body 201 will be explained later in detail.

The hardware configuration of the information processing apparatus 100 according to the present embodiment has been explained hereinabove. Each of the above constituent elements may be made of a general-purpose member, or may be made of hardware specialized for the function of each of the constituent elements. Therefore, the used hardware configuration can be changed as necessary in accordance with the level of technology when the embodiments are carried out.

(3) Functional Configuration of the Information Processing Apparatus

Figure 3:
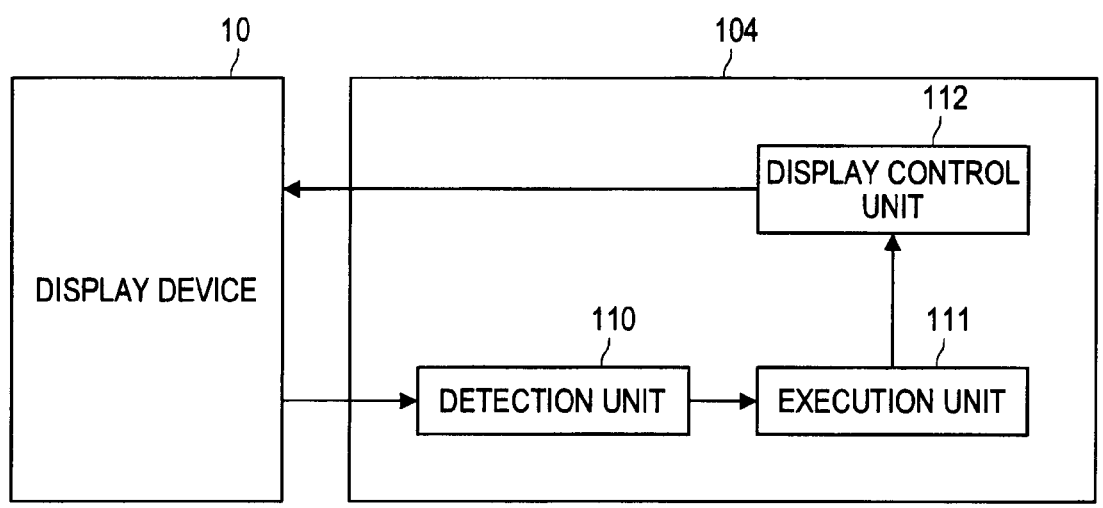
FIG. 3 is a block diagram showing a functional configuration of a control unit of the information processing apparatus according to the embodiment.

Next, the functions of the control unit of the information processing apparatus 100 according to the present embodiment will be explained with reference to FIG. 3. FIG. 3 is a block diagram showing the functional configuration of the control unit (CPU 104) of the information processing apparatus 100 according to the present embodiment.

As shown in FIG. 3, the control unit of the information processing apparatus 100 includes a detection unit 110, an execution unit 111, a display control unit 112, and the like. A display screen 10 shown in FIG. 3 has the functions of the touch panel serving as the input device 105 explained above and of the LCD serving as the display device 103.

The detection unit 110 has a function of detecting the angle of the operating body 201 to a reference coordinate axis on the display screen 10. The reference coordinate axis on the display screen 10 may be configured such that a predetermined direction is the y-axis and the direction perpendicular to the y-axis is the x-axis, or may be configured such that the twelve o'clock direction is 0 degrees. Alternatively, the reference coordinate axis may be configured such that the vertical direction of the housing of the information processing apparatus 100 is the y-axis and the horizontal direction of the housing thereof is the x-axis.

Figure 4:
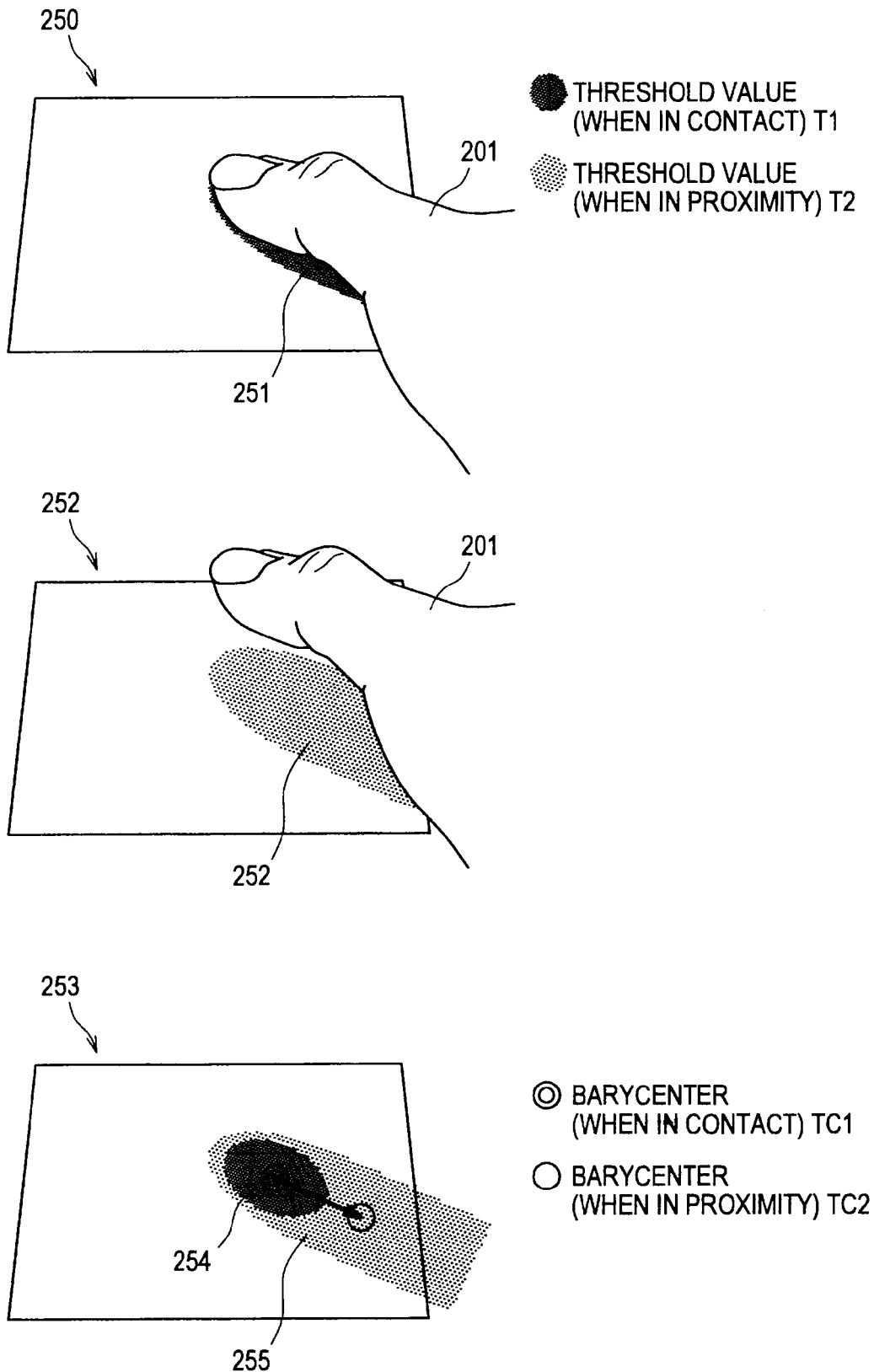
FIG. 4 is an explanatory diagram illustrating detection of the angle of the operating body according to the embodiment.

The detection of the angle of the operating body 201 by the detection unit 110 will be hereinafter explained with reference to FIG. 4. As shown in FIG. 4, a threshold value of variation of the capacitance of the electrostatic touch panel at which the operating body 201 is determined to be brought in contact with the electrostatic touch panel is T1, and a threshold value of variation of the capacitance of the electrostatic touch panel at which the operating body 201 is determined to be brought in proximity to the electrostatic touch panel is T2. For example, as shown in an explanatory diagram 250 of FIG. 4, when the operating body 201 is brought in contact with the electrostatic touch panel, the variation of the capacitance in a contacting portion 251 becomes equal to or more than the threshold value T1. On the other hand, as shown in an explanatory diagram 252, when the operating body 201 is brought in proximity to the electrostatic touch panel, the variation of the capacitance in a proximity portion 252 becomes equal to or more than the threshold value T2.

In reality, the operating body 201 is usually not parallel with the plane of the electrostatic touch panel, but is inclined to the plane. Therefore, as shown in an explanatory diagram 253, the proximity portion is formed around the contacting portion of the operating body 201. Accordingly, an area 254 in which the variation detected by the electrostatic sensor of the electrostatic touch panel is equal to or more than the threshold value T1 is surrounded by an area 255 in which the variation is equal to or more than the threshold value T2. In this case, the threshold value T1 is larger than the threshold value T2.

A weighted average coordinate of coordinates at which the variation is equal to or more than the threshold value T1 is defined by the detection unit 110 as a barycenter TC1 of the threshold value T1. Further, a weighted average coordinate of coordinates at which the variation is equal to or more than the threshold value T2 is defined by the detection unit 110 as a barycenter TC2 of the threshold value T2.

Then, the detection unit 110 determines whether the size of a vector from the barycenter TC1 of the threshold value T1 to the barycenter TC2 of the threshold value T2 (distance between two points) is equal to or more than a certain size. When the size of the vector is equal to or more than the certain size, the operating body 201 in an elongated shape like a finger is determined to be brought in contact with the electrostatic touch panel. Further, the direction of the vector is determined to be the direction in which the operating body 201 is brought in contact with the electrostatic touch panel. Therefore, the detection unit 110 can detect the angle of the operating body 201 by calculating the angle of inclination of the direction of the vector from TC1 to TC2 to the reference coordinate axis on the display screen 10.

For example, when the coordinate axis passing through the barycenter TC1 and parallel with the vertical direction of the housing of the information processing apparatus 100 is defined as the reference coordinate axis on the display screen, if the angle of the operating body 201 is inclined a predetermined angle to the right (for example, 15 degrees or more to the right) to the reference coordinate axis, the operating body 201 is determined to be the thumb of right hand. On the other hand, when the operating body 201 is inclined a predetermined angle to the left (for example, 15 degrees or more to the left) to the reference coordinate axis, the operating body 201 is determined to be the thumb of left hand. In this way, the detection unit 110 detects the angle of the operating body 201 to the reference axis on the display screen 10, and provides information about the detected angle to the execution unit 111.

FIG. 3 is referenced again. The execution unit 111 has a function of executing predetermined processings in accordance with the angle of the operating body 201 provided by the detection unit 110. The predetermined processings executed by the execution unit 111 mean a plurality of processings executed by the information processing apparatus 100. The execution unit 111 executes one of the plurality of processings in accordance with the angle of the operating body 201. The plurality of processings executed by the execution unit 111 may be processings of the same level, or may be processings of upper level and processings of lower level. Further, the execution unit 111 has a function of causing the later-described display control unit 112 to display a predetermined display on the display screen 10.

The display control unit 112 displays a plurality of display layers on the display screen 10 upon overlaying the plurality of display layers. The display control unit 112 displays, on the foreground, one of the plurality of display layers displayed on the display screen 10. For example, the above-described execution unit 111 may select one of the plurality of display layers in accordance with the angle of the operating body 201 detected by the detection unit 110. In this case, the display control unit 112 displays, on the foreground of the display screen 10, the display layer selected by the execution unit 111.

Further, the display control unit 112 may display the plurality of display layers on the display screen 10 upon transparently overlaying the plurality of display layers displayed on the display screen 10. In this case, the execution unit 111 may select one of the plurality of display layers displayed on the display screen 10 in accordance with the angle of the operating body 201 detected by the detection unit 110. Accordingly, the display control unit 112 displays the display layer selected by the execution unit 111 upon increasing the opacity of the display layer selected by the execution unit 111.

(4) Display Examples of the Information Processing Apparatus

Figure 5:
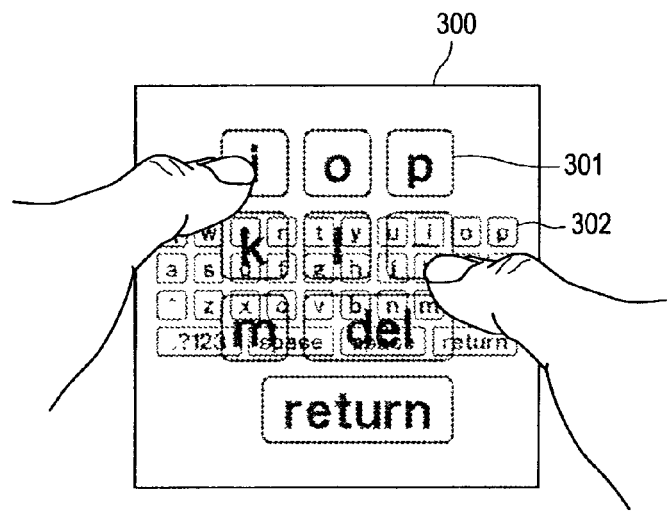
FIG. 5 is an explanatory diagram illustrating display examples of two types of display layers displayed in a semitransparent mode and coexisting on a display screen of the information processing apparatus according to the embodiment.
Figure 5:
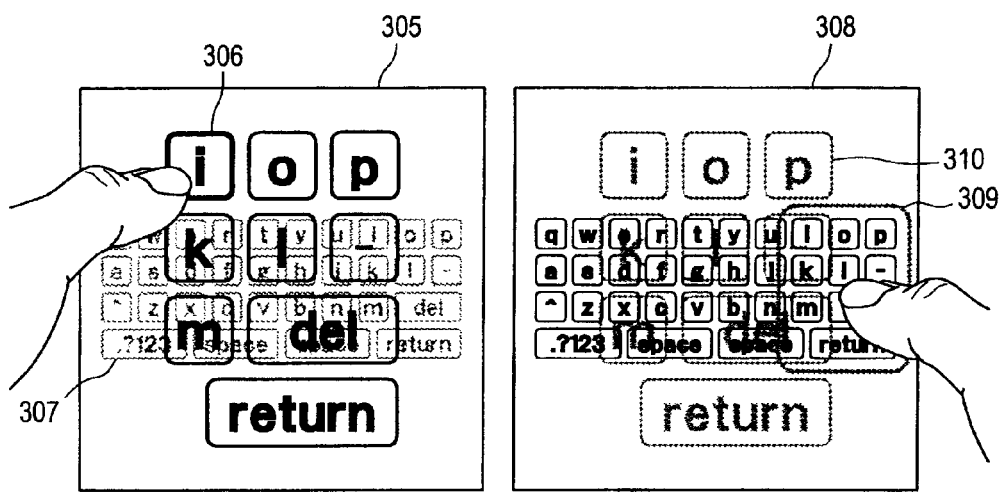

The functions of the control unit of the information processing apparatus 100 have been explained hereinabove. Next, the display examples of the display screen 10 of the information processing apparatus 100 will be explained with reference to FIGS. 5 to 7. FIG. 5 is an explanatory diagram illustrating display examples of the display screen 10. As shown in an exemplary display screen 300 of FIG. 5, two types of display layers (screen layers) are coexisting on the display screen 10, and each of them is displayed in a semitransparent mode on the screen.

The two types of display layers shown in the exemplary display screen 300 are a layer 302 and a layer 301. On the layer 302, the entire qwerty keyboard is displayed. On the layer 301, a portion of the qwerty keyboard is enlarged and displayed. The layer 302 and the layer 301 are overlaid and displayed in a semitransparent mode. For example, when the detection unit 110 determines that the operating body 201 is inclined to the left (the thumb of left hand is brought in proximity to or in contact with the electrostatic touch panel), the opacity of the layer 306, on which a portion of the qwerty keyboard is enlarged and displayed, increases as shown in the exemplary display screen 305. At this occasion, the opacity of the layer 307, on which the entire qwerty keyboard is displayed, does not change. As a result, the layer 306, on which a portion of the qwerty keyboard is enlarged and displayed, is displayed more clearly.

On the other hand, when the detection unit 110 determines that the operating body 201 is inclined to the right (the thumb of right hand is brought in proximity to or in contact with the electrostatic touch panel), the opacity of the layer 309, on which the entire qwerty keyboard is displayed, increases as shown in the exemplary display screen 308. At this occasion, the opacity of the layer 310, on which a portion of the qwerty keyboard is enlarged and displayed, does not change. As a result, the layer 309, on which the entire qwerty keyboard is displayed, is displayed more clearly.

Further, the execution unit 111 may be configured to execute different processings according to whether the thumb of right hand or left hand is brought in proximity to or in contact with the electrostatic touch panel. For example, when the thumb of right hand is brought in proximity to or in contact with the electrostatic touch panel, the opacity of the layer 309, on which the entire qwerty keyboard is displayed, increases as described above. Next, when the display screen 10 is tapped with the thumb of right hand, the focus is moved so that a portion of the qwerty keyboard to be enlarged and displayed is changed.

When the thumb of left hand is brought in proximity to or in contact with the electrostatic touch panel, a focused portion of the entire qwerty keyboard is enlarged and displayed. Next, when the display screen 10 is tapped with the thumb of left hand, a processing is executed to select one of the keys in the enlarged portion of the qwerty keyboard.

When the thumb of right hand or the thumb of left hand moves away from the display screen 10, the display screen 10 may return back to the exemplary display screen 300. Further, the processing executed when the thumb of right hand is determined to be brought in proximity to or in contact with the electrostatic touch panel and the processing executed when the thumb of left hand is determined to be brought in proximity to or in contact with the electrostatic touch panel may be configurable according to the preference of a user.

In other words, both of the processing for moving the focus of the qwerty keyboard upon the thumb of right hand being brought in proximity to or in contact with the electrostatic touch panel and the processing for selecting one of the keys in the enlarged portion of the qwerty keyboard upon the thumb of left hand being brought in proximity to or in contact with the electrostatic touch panel are coexisting in the exemplary display screen 300. In this way, two processings, i.e., the operation for moving the enlarged portion and the operation for selecting a key from within the enlarged portion, are coexisting in one display screen, and therefore, one of the processings can be selected in accordance with the angle of the operating body 201. As a result, an etendue efficient input method can be provided.

In the above example, both of the upper level processing for moving the focus in the entire qwerty keyboard and the lower level processing for selecting a key from within the enlarged portion of the qwerty keyboard are coexisting. An application for displaying a map and the like is another example of the processings executed in such a manner that the upper level processing and the lower level processing are coexisting. In the application for displaying a map and the like, an upper level processing for moving the focus in the entire map and a lower level processing for selecting a portion of an enlarged map to be enlarged may be coexisting.

Figure 6:
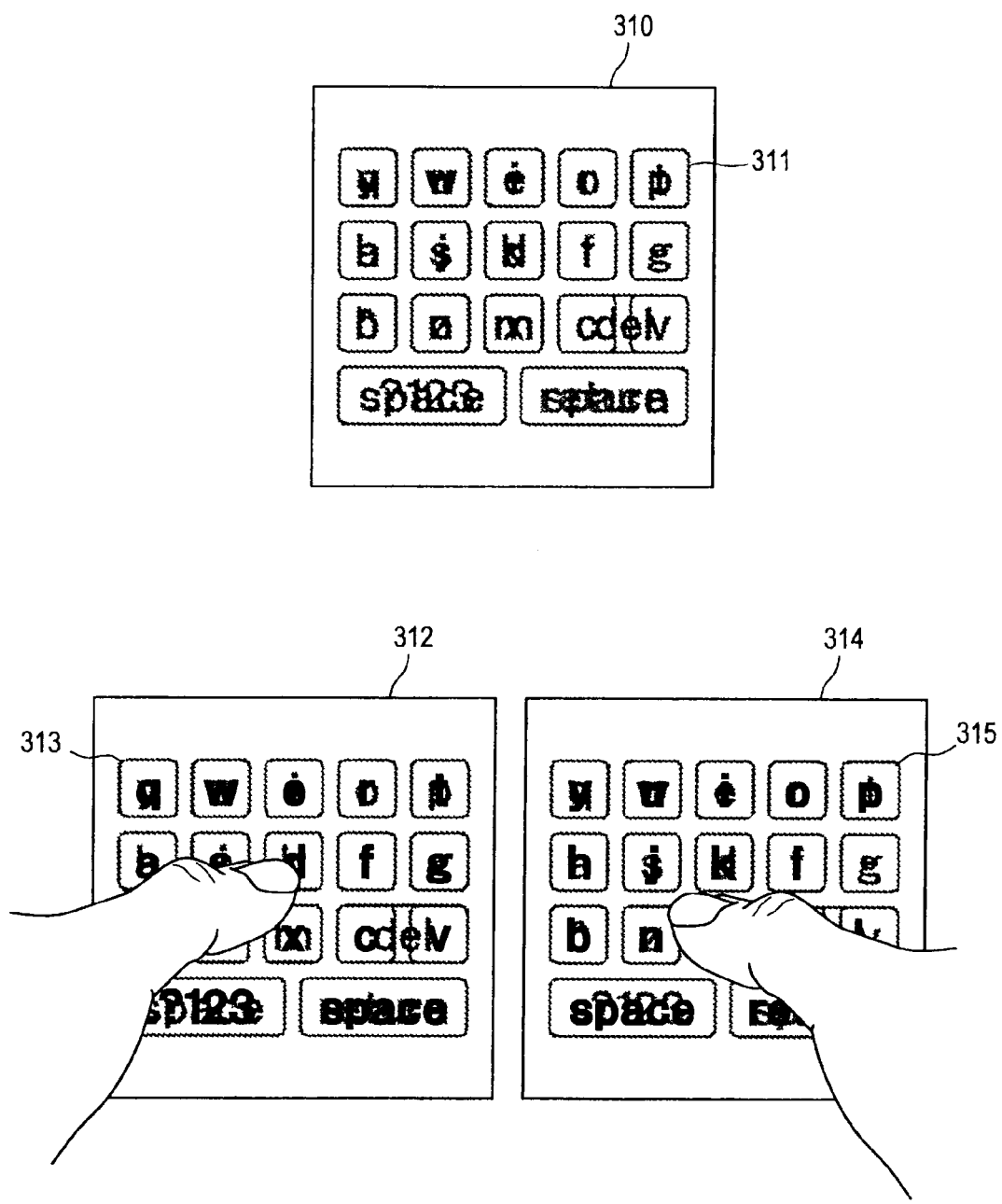
FIG. 6 is an explanatory diagram illustrating display examples of two types of display layers displayed in a semitransparent mode and coexisting on a display screen of the information processing apparatus according to the embodiment.

Further, the execution unit 111 may execute not only an upper level processing and a lower level processing which are coexisting but also a plurality of processings in the same level which are coexisting. Next, display examples of the display screen 10 in which processings of the same level are coexisting will be explained with reference to FIG. 6. FIG. 6 is an explanatory diagram illustrating display examples of the display screen 10. As shown in an exemplary display screen 310 of FIG. 6, two types of display layers (screen layers) are coexisting on the display screen 10, and each of them is displayed in a semitransparent mode on the screen.

The two types of display layers shown in the exemplary display screen 310 include a layer for displaying right half of the qwerty keyboard and another layer for displaying left half of the qwerty keyboard, which are overlaid and displayed in a semitransparent mode. For example, when the detection unit 110 determines that the thumb of left hand is brought in proximity to or in contact with the electrostatic touch panel, the opacity of a layer 313, on which the left half of the qwerty keyboard is displayed, increases as shown in an exemplary display screen 312. At this occasion, the opacity of the layer, on which the right half of the qwerty keyboard is displayed, does not change. As a result, the layer 313, on which the left half of the qwerty keyboard is displayed, is displayed more clearly.

On the other hand, when the detection unit 110 determines that the thumb of right hand is brought in proximity to or in contact with the electrostatic touch panel, the opacity of a layer 315, on which the right half of the qwerty keyboard is displayed, increases as shown in an exemplary display screen 314. At this occasion, the opacity of the layer, on which the left half of the qwerty keyboard is displayed, does not change. As a result, the layer 315, on which the right half of the qwerty keyboard is displayed, is displayed more clearly.

As described above, in the exemplary display screen 310, when the thumb of right hand is brought in proximity to or in contact with the electrostatic touch panel, the key arrangement of the right half of the qwerty keyboard is applied, and when the thumb of left hand is brought in proximity to or in contact with the electrostatic touch panel, the key arrangement of the left half is applied. In this way, the plurality of processings in the same level which are coexisting within one display screen can be executed. Therefore, the size of the keyboard, which is preferably accommodated in one screen, can be made half the original size, and it is possible to reduce erroneous operation caused by tapping the display screen 10 with a fat finger.

In the exemplary display screen 310, the display layer of the left half of the qwerty keyboard and the display layer of the right half of the qwerty keyboard are overlaid and displayed in semitransparent mode, but the present invention is not limited thereto. For example, one key may display one of the keys in the left half of the qwerty keyboard and one of the keys in the right half of the qwerty keyboard. For example, one of the keys in the left half of the qwerty keyboard, q, and one of the keys in the right half of the qwerty keyboard, y, are displayed at the same position. When the thumb of left hand is brought in proximity to or in contact with the electrostatic touch panel, the one of the keys in the left half of the qwerty keyboard, q, is displayed to emerge. When the thumb of right hand is brought in proximity to or in contact with the electrostatic touch panel, the one of the keys in the right half of the qwerty keyboard, y, is displayed to emerge.

Figure 7:
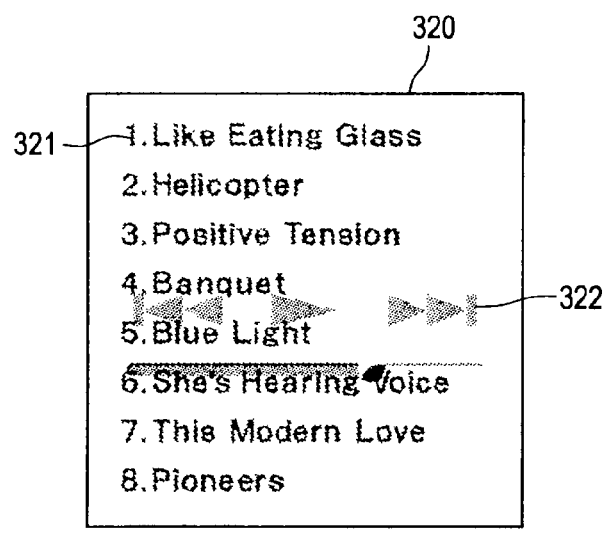
FIG. 7 is an explanatory diagram illustrating display examples of two types of display layers displayed in a semitransparent mode and coexisting on a display screen of the information processing apparatus according to the embodiment.
Figure 7:
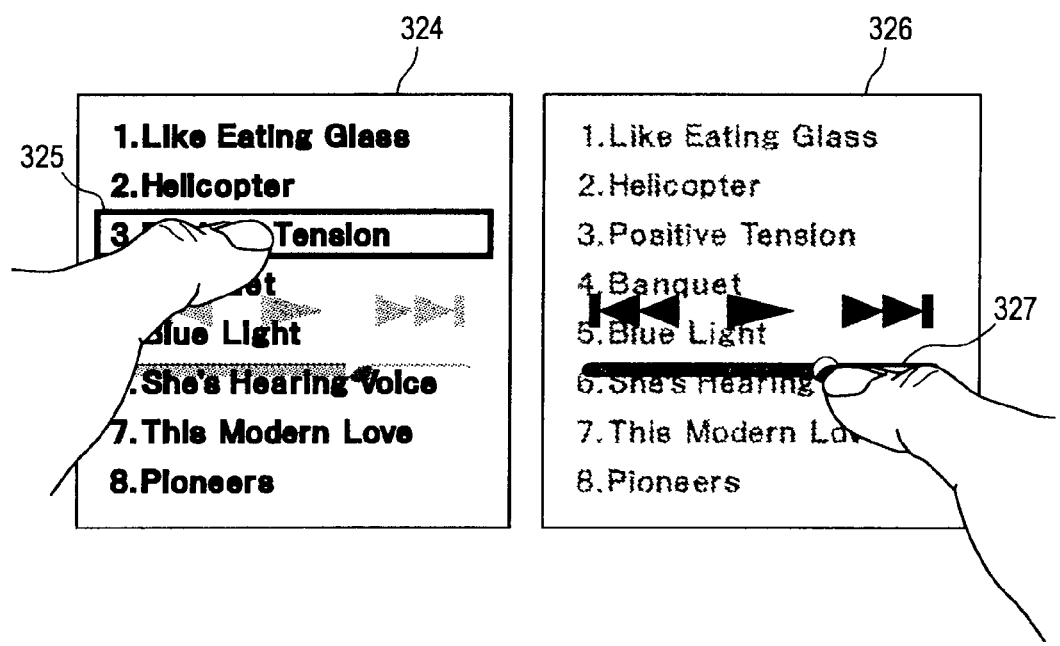

Next, an exemplary display screen for operating an audio player will be explained with reference to FIG. 7. FIG. 7 is an explanatory diagram illustrating a display example on the display screen 10. As shown in an exemplary display screen 320, two types of display layers (screen layers), i.e., music lists 321 and a music control panel 322, are coexisting on the display screen 10, and each of them is displayed in a semitransparent mode on the screen. The music control panel 322, for example, controls reproducing, stopping, and volume change of music.

When the detection unit 110 determines that the thumb of left hand is brought in proximity to or in contact with the electrostatic touch panel, the opacity of a layer 325, on which music lists are displayed, increases as shown in an exemplary display screen 324. At this occasion, the opacity of the layer, on which the music control panel is displayed, does not change. As a result, the layer 325, on which the music lists are displayed, is displayed more clearly.

On the other hand, when the detection unit 110 determines that the thumb of right hand is brought in proximity to or in contact with the electrostatic touch panel, the opacity of a layer 327, on which the music control panel is displayed, increases as shown in an exemplary display screen 326. At this occasion, the opacity of the layer, on which the music lists are displayed, does not change. As a result, the layer 327, on which the music control panel is displayed, is displayed more clearly.

When the thumb of left hand is brought in proximity to or in contact with the electrostatic touch panel, the execution unit 111 executes a processing for selecting a music list, which is tapped and the like, from the music list displayed on the layer 325. On the other hand, when the thumb of right hand is brought in proximity to or in contact with the electrostatic touch panel, the execution unit 111 executes a processing for reproducing and stopping music, increasing and decreasing the volume, and the like, in accordance with the display on the music control panel displayed on the layer 327.

(5) Operation of the Information Processing Apparatus

Figure 8:
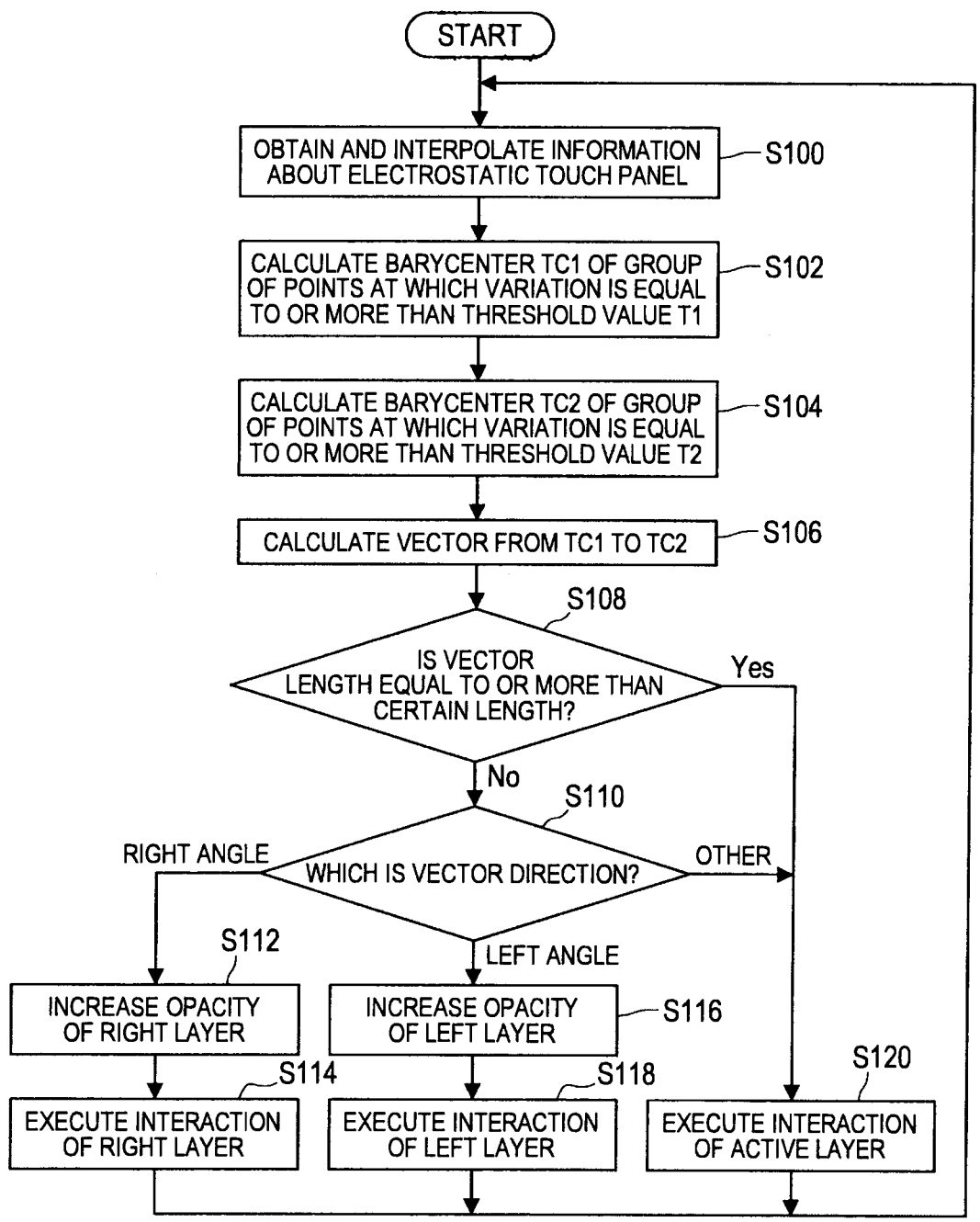
FIG. 8 is a flowchart illustrating an information processing method of the information processing apparatus according to the embodiment.

The display examples of the display screen 10 of the information processing apparatus 100 have been explained hereinabove. Next, an information processing method of the information processing apparatus 100 will be explained with reference to FIG. 8. FIG. 8 is a flowchart illustrating the information processing method of the information processing apparatus 100. In the below, a case where the information processing apparatus 100 has the electrostatic touch panel will be explained.

First, the information processing apparatus 100 generates a thread for monitoring a variation of capacitance of the electrostatic touch panel when a predetermined application starts. Then, the detection unit 110 obtains the capacitance of each of the electrostatic sensors on the electrostatic touch panel, and interpolates the obtained capacitances with an arbitrary resolution (S100). In step S100, the detection unit 110 compares the capacitance at the start of the application and the capacitance when the operating body is brought in contact with the electrostatic touch panel, and obtains calculated differences to interpolate the obtained differences with an arbitrary resolution.

Then, the detection unit 110 calculates the barycenter TC1 of a group of points at which the variation of the capacitance is equal to or more than the threshold value T1, in accordance with the detection method illustrated in FIG. 4 (S102). As described above, the threshold value T1 is a threshold value at which the operating body is determined to be brought in contact with the electrostatic touch panel.

Then, the detection unit 110 calculates the barycenter TC2 of a group of points at which the variation of the capacitance is equal to or more than the threshold value T2, in accordance with the detection method illustrated in FIG. 4 (S104). As described above, the threshold value T2 is a threshold value at which the operating body is determined to be brought in proximity to the electrostatic touch panel, and is larger than the threshold value T1. Then, the detection unit 110 calculates a vector from the barycenter TC1 calculated in step S102 to the barycenter TC2 calculated in step S104 (S106).

Next, the detection unit 110 determines whether the length of the vector calculated in step S106 is equal to or longer a certain length (S108). In the determination in step S108, the detection unit 110 may determine whether the length of the vector is equal to or more than, for example, 20 mm to 30 mm in order to determine whether the vector is about the length of, for example, a finger. In step S108, an elongated operating body like a finger whose vector length is more than the certain length is determined to be brought in contact with the electrostatic touch panel.

When the length of the vector is determined to be equal to or more than the certain length in step S108, the detection unit 110 calculates the direction of the vector, and determines whether the direction of the vector is inclined to the right, left, or other angle (S110). In step S110, for example, when the reference coordinate axis on the display screen is configured to be the twelve o'clock direction (0 degrees), if the vector is in a direction from 90 degrees to 180 degrees, the angle of the contacting body is determined to be inclined to the right. When the angle of the contacting body is inclined to the right, the contacting body is determined to be the thumb of right hand. On the other hand, when the vector is in a direction from 180 degrees to 270 degrees, the angle of the contacting body is determined to be inclined to the left. When the angle of the contacting body is inclined to the left, the contacting body is determined to be the thumb of left hand.

When the angle of the contacting body is determined to be inclined to the right (the contacting body is the thumb of right finger) in step S110, the display control unit 112 increases the opacity of the layer specified as the right layer so as to display the layer more clearly (S112). The execution unit 111 executes a processing (interaction) corresponding to the display screen displayed on the right layer (S114).

When the angle of the contacting body is determined to be inclined to the left (the contacting body is the thumb of left finger) in step S110, the display control unit 112 increases the opacity of the layer specified as the left layer so as to display the layer more clearly (S116). The execution unit 111 executes a processing (interaction) corresponding to the display screen displayed on the left layer (S118).

When the angle of the contacting body is determined to be inclined to neither left nor right in step S110, the execution unit 111 executes a processing (interaction) corresponding to the display screen displayed on the layer previously having become active (S120). When a user does not operate the information processing apparatus 100 for a certain period of time or more in steps S114, S118, and S120, the layer, whose opacity is once increased and which has become active, returns back to the original state so that the opacity thereof returns back to the same opacity as other layers.

In the explanation of the present embodiment, the operation body is assumed to be a finger of a user, but the present invention is not limited thereto. For example, the operating body may be a hand of a user, a stylus, and the like. The information processing method of the information processing apparatus 100 has been explained hereinabove.

The information processing apparatus 100 according to the present embodiment detects the angle of the operating body to the reference coordinate axis on the display screen 10, and can execute a predetermined processing in accordance with the detected angle of the operating body. The predetermined processing includes a plurality of processings, and one of the plurality of processings can be executed in accordance with the angle of the operating body. Therefore, a predetermined processing can be executed in accordance with the angle of the operating body being in contact with or in proximity to the display screen 10 of the information processing apparatus 100. For example, a plurality of display layers may be overlaid on the display screen 10, and one of the plurality of display layers displayed on the display screen 10 may be selected in accordance with the angle of the operating body. In this case, a processing may be executed in accordance with the selected display layer.

Since the electrostatic touch panel is used in the information processing apparatus 100, the shape and the direction of the finger can be determined based on the contact and proximity information about the operating body. Therefore, when the operating body is a finger of a user, it is possible to determine whether the finger is the thumb of right hand or the thumb of left hand. It is possible to realize an application capable of executing different processings depending on whether the thumb of right hand is brought in contact with or in proximity to the electrostatic touch panel or the thumb of left hand is brought in contact with or in proximity to the electrostatic touch panel. Therefore, a user can input information with button arrangements specialized for right-handed people or left-handed people.

An entire view of an upper level and a zoom view of a lower level can be overlaid in one screen at the same time, and when the display screen is tapped with a finger of left hand or a finger of right hand, respective different processings can be executed. Therefore, the limitation imposed on the size of the display screen of a mobile apparatus can be alleviated.

It should be understood by those skilled in the art that various modifications, combinations, sub-combinations and alterations may occur depending on design requirements and other factors insofar as they are within the scope of the appended claims or the equivalents thereof.

In the above embodiment, for example, the operating body is a finger of a user, and whether the finger is the thumb of left hand or the thumb of right hand is determined, but the present invention is not limited thereto. For example, when a plurality of users bring their hands in proximity to or in contact with a display screen such as a touch panel, the angle of the hand of each user may be detected.

The present application contains subject matter related to that disclosed in Japanese Priority Patent Application JP 2008-316976 filed in the Japan Patent Office on 12 Dec. 2008, the entire content of which is hereby incorporated by reference.

What is claimed is:

1. An information processing apparatus comprising:
a detection unit configured to detect an angle of an operating body relative to a reference coordinate axis on a display screen;
an execution unit configured to execute a processing selected from a plurality of predetermined processings, based on the angle of the operating body detected by the detection unit; and
a display control unit configured to control the display screen to display a first display layer and a second display layer, the first display layer and the second display layer displayed to be overlaid together, and at least one of the first display layer and the second display layer being displayed as a semitransparent layer,
wherein the plurality of predetermined processings comprises at least one of a first processing of selecting the first display layer as an active layer and increasing an opacity of the first display layer, and a second processing of selecting the second display layer as the active layer and increasing an opacity of the second display layer, and one of the first processing and the second processing is selected for execution by the execution unit based on the angle detected by the detection unit.

2. The information processing apparatus according to claim 1,
wherein the detection unit uses a touch panel using a capacitance or an infrared light to detect the angle of the operating body brought in contact with or in proximity to the information processing apparatus.

3. The information processing apparatus according to claim 1,
wherein the plurality of processings executed by the execution unit are processings of a same level, and
the execution unit executes one of the processings of the same level in accordance with the angle of the operating body detected by the detection unit.

4. The information processing apparatus according to claim 1,
wherein the plurality of processings executed by the execution unit are an upper level processing and a lower level processing,
and the execution unit executes any one of the upper level processing and the lower level processing in accordance with the angle of the operating body detected by the detection unit.

5. The information processing apparatus according to claim 1,
wherein the detection unit detects the angle of the operating body in accordance with a positional relationship between a first barycenter position of a contacting portion of the operating body and a second barycenter position of a proximity portion of the operating body.

6. The information processing apparatus according to claim 4,
wherein the detection unit calculates a vector from the first barycenter position to the second barycenter position, and detects the angle of the operating body to the reference coordinate axis on the display screen based on a direction of the vector.

7. The information processing apparatus according to claim 4,
wherein the detection unit determines that the operating body is a finger of a right hand when the direction of the vector from the first barycenter position to the second barycenter position is determined to be inclined right of the reference coordinate axis on the display screen, and determines that the operating body is a finger of a left hand when the direction of the vector is determined to be inclined left of the reference coordinate axis on the display screen.

8. The information processing apparatus according to claim 1, wherein the display control unit controls the display screen to overlay and display thereon a plurality of display layers including the first display layer and the second display layer,
and the display control unit controls the display screen to display, on a foreground of the display screen, one of the first display layer and the second display layer as the active layer, corresponding to the selection of one of the first processing and the second processing by the execution unit.

9. The information processing apparatus according to claim 8,
wherein the display control unit controls the display screen to overlay and display thereon the plurality of display layers in such a manner that the plurality of display layers are transparent,
the execution unit selects one of the plurality of first display layer and the second display layer displayed on the display screen in accordance with the angle of the operating body detected by the detection unit,
and the display control unit controls the display screen to display the selected one of the first display layer and the second display layer upon increasing an opacity of the selected one of the first display layer and the second display layer.

10. An information processing method comprising the steps of:
detecting an angle of an operating body relative to a reference coordinate axis on a display screen;
selecting and executing a processing selected from a plurality of predetermined processings, based on the detected angle of the operating body; and
displaying, on the display screen, a first display layer and a second display layer, the first display layer and the second display layer displayed to be overlaid together, and at least one of the first display layer and the second display layer being displayed as a semitransparent layer,
wherein the plurality of predetermined processings comprises at least one of a first processing of selecting the first display layer as an active layer and increasing an opacity of the first display layer, and a second processing of selecting the second display layer as the active layer and increasing an opacity of the second display layer, and one of the first processing and the second processing is selected and executed based on the detected angle.

11. A non-transitory computer readable medium having stored thereon a program, which when executed by a computer, causes the computer to perform an information processing method comprising:
detecting an angle of an operating body relative to a reference coordinate axis on a display screen;
selecting and executing a processing selected from a plurality of predetermined processings, based on the detected angle of the operating body; and
displaying, on the display screen, a first display layer and a second display layer, the first display layer and the second display layer displayed to be overlaid together, and at least one of the first display layer and the second display layer being displayed as a semitransparent layer,
wherein the plurality of predetermined processings comprises at least one of a first processing of selecting the first display layer as an active layer and increasing an opacity of the first display layer, and a second processing of selecting the second display layer as the active layer and increasing an opacity of the second display layer, and one of the first processing and the second processing is selected and executed based on the detected angle.

12. The information processing apparatus according to claim 7, wherein the execution unit selects a different type of processing based on the determination of the detection unit.

13. The information processing apparatus according to claim 8, wherein one of first display layer and the second display layer comprises an entire virtual keyboard, and the other one of the first display layer and the second display layer comprises a portion of the entire virtual keyboard.

14. The information processing apparatus according to claim 8, wherein one of the first display layer and the second display layer comprises a song playlist, and the other one of the first display layer and the second display layer comprises a music control panel.

15. The information processing apparatus according to claim 1,
wherein the detection unit is further configured to determine whether the operating body is a left-side operating body or a right-side operating body angle based on the detected angle.

16. The information processing apparatus according to claim 15,
wherein the first processing is selected for execution by the execution unit when the detection unit determines that the operating body is the left-side operating body, and the second processing is selected by execution by the execution unit when the detection unit determines that the operating body is the right-side operating body.

17. The information processing apparatus according to claim 15,
wherein the first processing is selected for execution by the execution unit when the detection unit determines that the operating body is brought in contact with or in proximity to the information processing apparatus, and that the operating body is the left-side operating body, and
wherein the second processing is selected for execution by the execution unit when the detection unit determines that the operating body is brought in contact with or in proximity to the information processing apparatus and that the operating body is the right-side operating body.

18. The information processing apparatus according to claim 1, wherein the first display layer comprises a left portion of a virtual QWERTY keyboard, and the second display layer comprises a right portion of the virtual QWERTY keyboard, and the first display layer and the second display layer are displayed to be overlapped such that keys of the left portion of the virtual QWERTY keyboard correspond to and overlap with respective corresponding keys of the right portion of the virtual QWERTY keyboard in a same shared space of the display screen.

19. The information processing apparatus according to claim 16, wherein the first display layer comprises a left portion of a virtual QWERTY keyboard, and the second display layer comprises a right portion of the virtual QWERTY keyboard, and the first display layer and the second display layer are displayed to be overlapped such that keys of the left portion of the virtual QWERTY keyboard correspond to and overlap with respective corresponding keys of the right portion of the virtual QWERTY keyboard in a same shared space of the display screen.

* * * * *